March 1, 1927.

G. SPERTI

ELECTRIC METER

Filed Feb. 16, 1922

INVENTOR:
George Sperti
BY
ATTORNEYS.

March 1, 1927.

G. SPERTI

ELECTRIC METER

Filed Feb. 16, 1922  4 Sheets-Sheet 2

1,619,002

INVENTOR:
George Sperti
BY
Allen & Allen
ATTORNEYS.

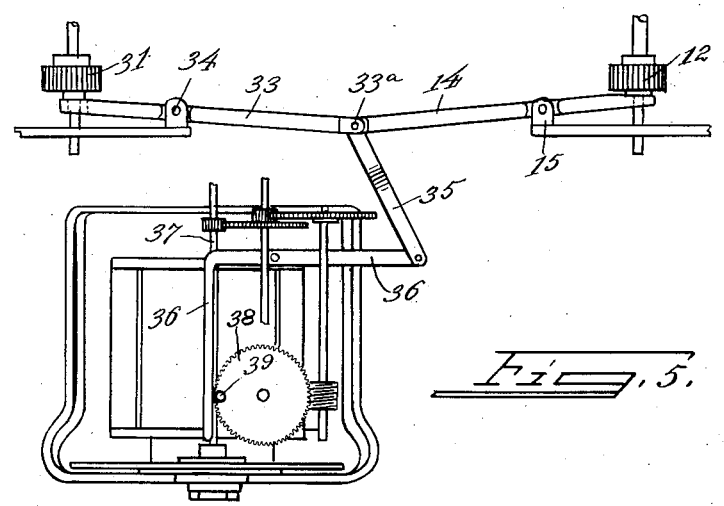
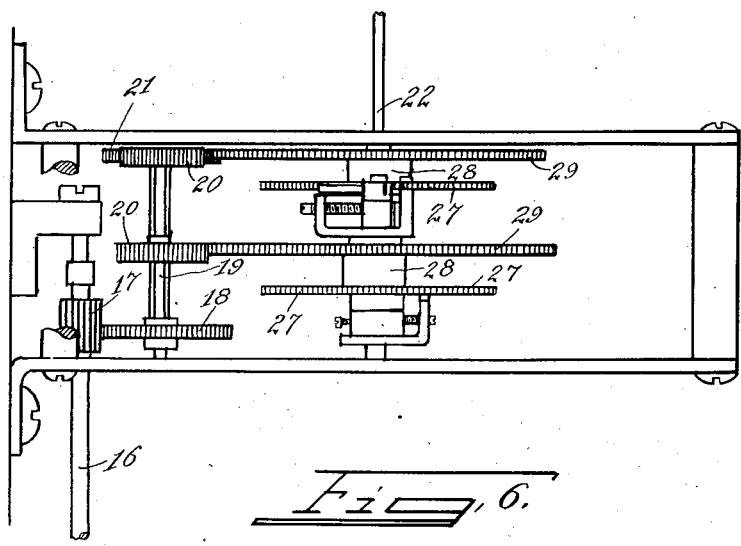
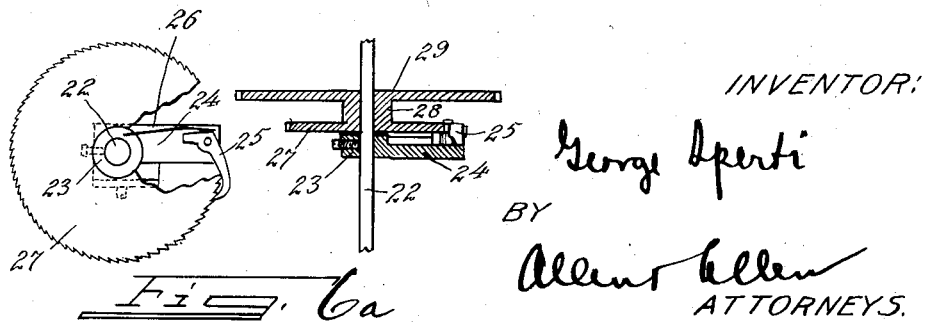

March 1, 1927.
G. SPERTI
ELECTRIC METER
Filed Feb. 16, 1922   4 Sheets-Sheet 4
1,619,002
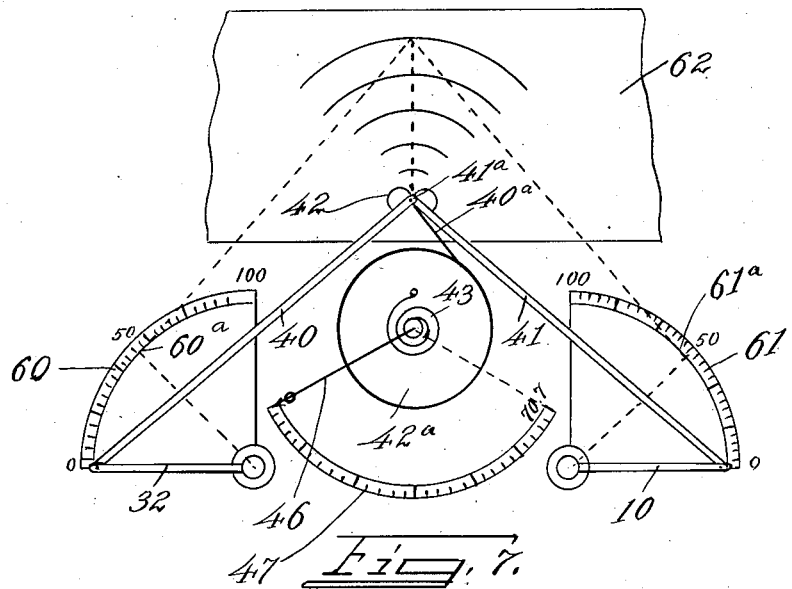
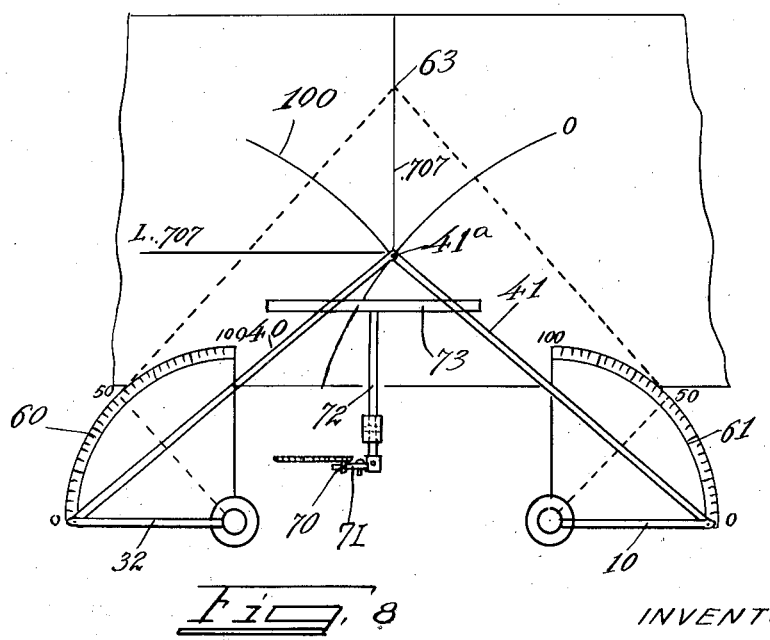
INVENTOR:
George Sperti
BY
Allen & Allen
ATTORNEYS.

Patented Mar. 1, 1927.

1,619,002

UNITED STATES PATENT OFFICE.

GEORGE SPERTI, OF COVINGTON, KENTUCKY, ASSIGNOR OF ONE-FOURTH TO ARTHUR F. BLECKSMITH, OF DAYTON, KENTUCKY.

ELECTRIC METER.

Application filed February 16, 1922. Serial No. 536,956.

My invention relates to an electric metering device designed to express in a readily available manner the various functions and features of alternating current utilized by the consumer and including a direct reading of watt hours used.

The object of my invention is to provide in a simple installation a device with registers and indicators, which will give direct readings of necessary factors in electrical service.

In my invention I provide, in connection with continuously moving or time integrated meters, for readings of the volt-ampere-hours, reactive volt-ampere-hours, watt hours, and the maximum demands of these for any predetermined interval of time, as well as for numerous other readings. I am not aware of any metering device in the past which utilizes meters energized in-phase or out-of-phase, and which by their joint action move another member at a rate proportionate to the vector sum of the rates of the meters. This specifically is what I do and thereby I attain my various objects with the use of dials, friction pointers and the like. Special attention is called to the fact that the well known accuracy of the integrating property of volt-ampere-hours and watt hour meters is made available in this invention.

These objects, which are merely the immediate ones for which my invention is designed, I obtain by that certain construction and arrangement of parts to be hereinafter more specifically pointed out and claimed.

In the drawings,

Figure 5 is a detail front elevation on a larger scale showing portions of the constant speed motor used as a timing element.

Figure 6 is an enlarged front elevation of the constant direction gearing for the wattless component meter. Figure 6ª is a detail plan and section of one of the pawl and ratchet devices shown in Figure 6.

Figure 7 is a diagram showing the use of my device.

Figure 8 is a diagram showing how power factor may be directly expressed thereon.

It has not been attempted to show all of the gear trains or the electrical connections for the meters, since this is a matter which may vary for different installations and vary for different forms of meter. Also I wish it expressly understood that the apparatus shown and to be described is merely one of the many possible arrangements which are possible with the use of the principles on which my invention is based.

Figure 1:
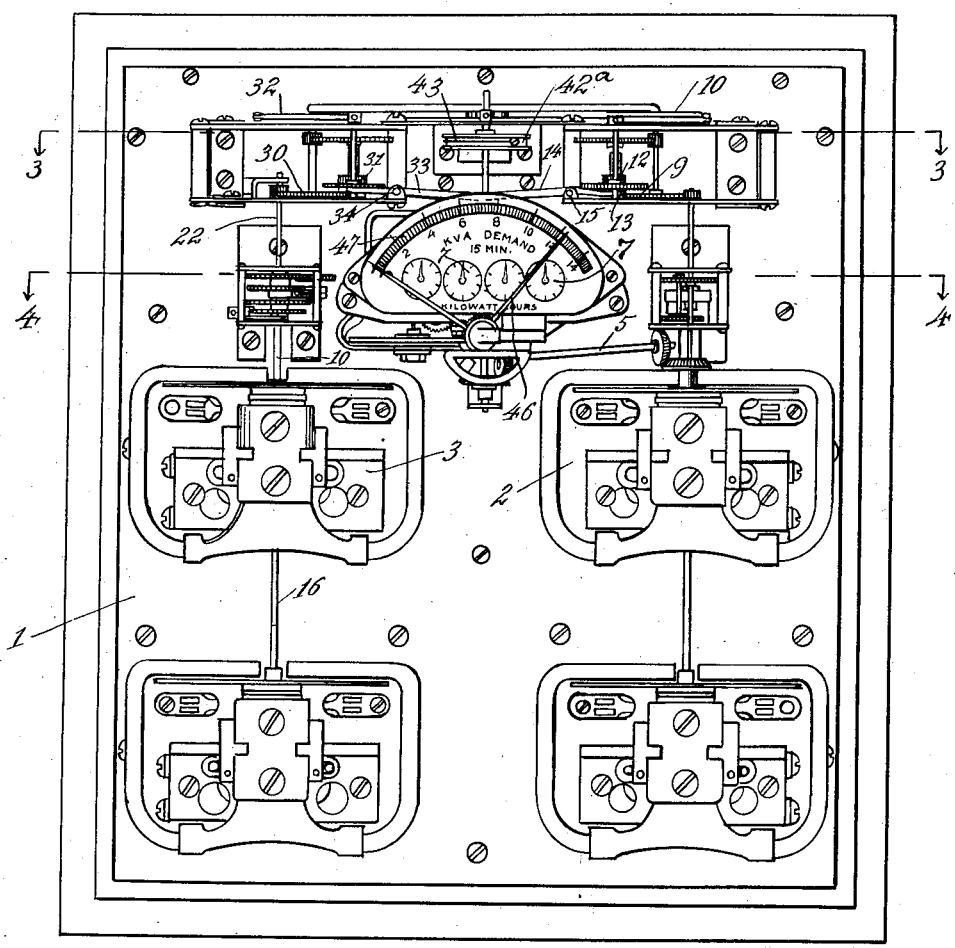
Figure 1 is a front elevation of a meter constructed in accordance with my invention.
Figure 2:
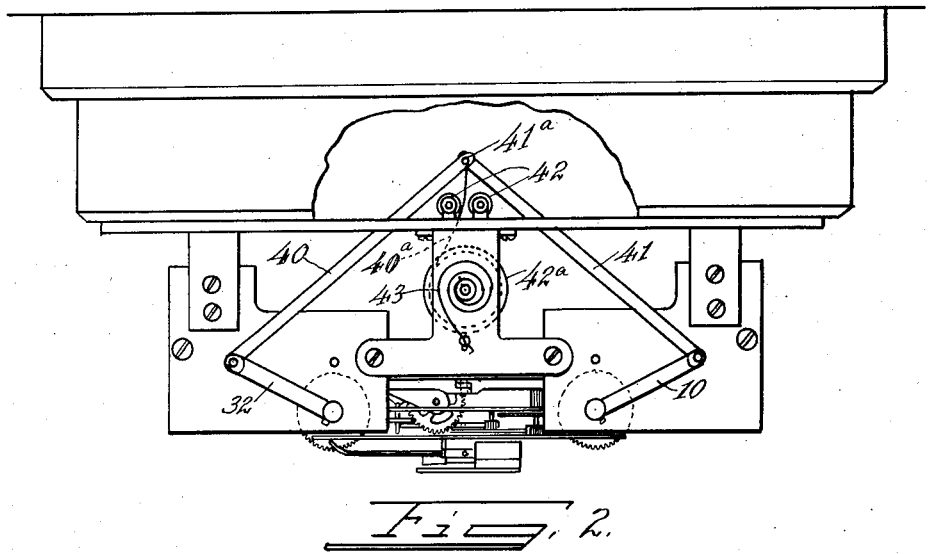
Figure 2 is a plan view of the operating parts for the indicator mechanism.
Figure 3:
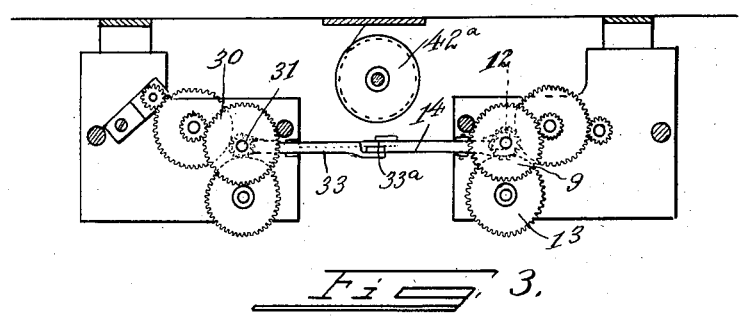
Figure 3 is a section of the time-controlled clutch device which permits a timed resetting of the indicator mechanism, the section taken on the line 3, 3, of Figure 1.
Figure 4:
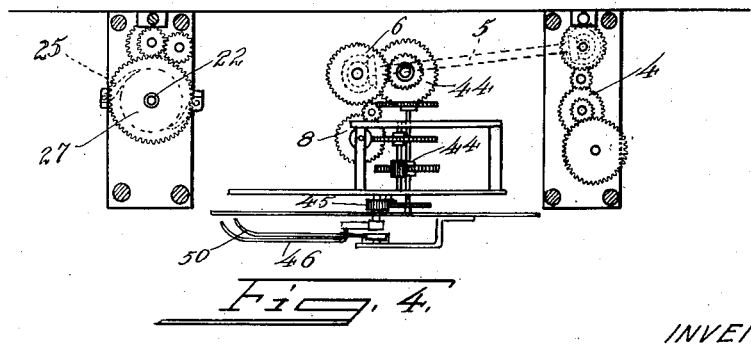
Figure 4 is a section of various gear trains driven by the two meters, the section taken on the line 4, 4, of Figure 1.

On a board 1 are mounted electric meters 2 and 3 with the right hand meter 2 (Figure 1), an in-phase watt hour meter of any desired design, and the left hand meter 3, a wattless component meter or reactive volt-ampere meter which is another and more generally used name for the same thing. This meter 3 will hereinafter be termed the R. V. A. H. meter, and the meter 2, the W. H. meter.

From the W. H. meter a train of gearing 4 connects to a shaft 5, which beveled gearing connects up with the gear train 6, which drives the integrating or registering dials 7 through a gear train 8. These dials give a reading in kilo-watt hours which is usual practice.

The meter 2 has its rotor shaft also connected with another gear train 9, which is located at the upper end of the machine and has a lever 10 thereon, which is driven by the meter 2. One element of this train 9, inserted between the meter shaft and the arm 10, is a sliding pinion 12, which, when moved upwardly, comes to a position out of mesh with the pinion 13 with which it meshes when in its lower position.

To shift this pinion to unclutched position, I provide a lever 14 mounted to rock in a bracket 15 on the frame that supports the last noted gear train. At the proper period a time element depresses the inner end of this lever and thus unclutches the lever 10 from the shaft of the meter and its trains of gears.

This period of time will naturally be such as to release the arm 10 before its movement becomes too great to permit the indicator device to operate properly, as will be noted when this device is described.

Referring to the meter 3, it should be noted that this meter differs from the meter 2 not so much in construction as in the fact that it is connected out-of-phase with the current instead of in-phase, whereby its revolutions are accomplished by reactive volt-amperes.

Since the R. V. A. may revolve this meter clockwise or counterclockwise, dependent upon changes in direction of the wattless component in split phase practice, it is desirable to insert a constant direction gear train instead of a direct driven train.

Therefore, the spindle or shaft 16 of the meter is connected with a pinion 17 which meshes with the gear 18 on the shaft 19. This shaft carries a sleeve having two like gears 20 thereon, the upper gear having constant connection with a reversing gear 21.

Fast on the arbor or shaft 22 is a sleeve 23 carrying a pair of pawl carriers 24, each of which has a pawl 25 thereon. These pawls are spring-pressed by strips 26 against the peripheries of ratchets 27 loose on the shaft. The ratchets 27 are connected by common sleeves 28 with the gears 29, 29, also loose on the shaft. One of the gears 29 meshes with the one gear 20 and the other with the reversing gear 21.

As a result of this, the lower gear 20 and the reversing gear 21 are always turning in the opposite direction to each other, and each pawl 25 is pressing against its ratchet 27 at all times. When either ratchet is turning in a clockwise direction, it slips under its pawl and thus does not turn the shaft, while this taking place for one pawl, the other pawl is being driven in a counterclockwise direction by its ratchet.

Thus whichever way the meter arbor revolves, the shaft or arbor 22 is always being turned in a counterclockwise direction.

The arbor 22 is connected with a gear train 30, which embodies a shiftable pinion 31 as in the case of the gear train 9. The lever 32, similar to the lever 10, is moved as the meter revolves, unless this pinion 31 is pressed upwardly, which is accomplished as in the first instance by a rock lever 33 pivoted at 34 on the frame that houses the gear train 30.

The two levers 33 and 14 are connected together at 33ª, the pivot serving also to connect with the levers at this central point a depending link 35.

The link 35 is connected to a bell crank lever 36, forming part of the timing device, so that once in a given interval the lever 36 is rocked, the link pulled down and the two levers 33 and 14 pulled down, which unclutches the movable pinions in the trains 9 and 30.

The timing device in this instance, instead of a clockwork, which would require winding, is a constant speed motor having an armature shaft 37 and a gear train terminating, for example, in a pinion 38. This pinion 38 will have a stud 39 thereon to contact with the depending end of the bell crank lever 36, thus rocking the lever at timed intervals.

In a preferred embodiment I provide for a rocking of the bell crank lever once every 15 minutes.

It may now be observed that the arc through which the outer ends of the two levers 32 and 10 are moved in a given interval of time will provide an indication of that component of the V. A. used and that not used or expressed otherwise of watts used for a period of 15 minutes and reactive volt-amperes used for a period of 15 minutes.

The sum vectorially expressed of these two will give an indication of the volt-ampere hours passing over the lines, and the power factor of the installation of the consumer can be trigonometrically calculated or charted from the relation of said two arcs. Before discussing the charts I will first describe the V. A. H. mechanism shown in Figures 1–6.

In order to express the V. A. H. I connect to the ends of the two levers 32 and 10, which are of equal length, levers 40 and 41, also equal, which are connected together at their outer ends by a pivot pin 41ª. To this pin is connected a silk cord 40ª, which passes between two small rollers 42.

The movement of the point of juncture of the two levers gives the result of the joint action of the two components and the length of the silk cord from the point between the two rollers will give me the result of the joint action, which cord length I can express on a dial.

I express the length of the cord as follows: On the frame of the machine is a drum 42ª having its spindle connected to a spring 43 and also to a gear train 44. The train 44 operates a segment 45 to which is connected the indicator arrow 46, but stays where it is, when the arrow is returned to starting position at each 15 minute interval.

The action of the timing mechanism in releasing the levers 10 and 32 from the meter gear trains permits the spring on the drum to revolve the drum back to starting position, drawing in on the cord and returning the levers that actuate the cord to their starting position also.

The dial 47 is calibrated to express in any convenient units the distance of the indicator from the starting point. It is apparent that given a number of installations, such as described, the comparative high points which the arrows 50 indicate, will give a figure which can be used in calculating a graduated charge per K. W. H. for the consumer.

Thus the meter will not only show the total amount of effective energy used (W. H.) but will also show the maximum V. A. demand for a period of 15 minutes or such other short period as is selected, i. e., it will give the peak load volt-ampere-hour (V. A. H.) reading for periods of 15 minutes.

The use of time integrated or continuously moving meters provides power which can effectively be utilized to operate indicators, registers and graphic devices. If the time element were omitted, then the gearing would have to be such as to limit the motion of the arrows, so that between periods of examination they would not move off the dial and the resultant indication would give a direct reading of the consumer's K. V. A. H. demand for the said period and could be so calibrated.

It will give a maximum V. A. H. demand for the selected period of time between examinations of the meter or total V. A. H. demand as above indicated.

I am enabled to use ordinary W. H. meters which, in addition, give me the W. H. used.

Referring now to Figures 7 and 8, I will point out wherein my device may be used to give readings of all of the in-phase and out-of-phase functions of an alternating current circuit. It should be remembered that in my mechanism the forces used are those which are time integrated, or, in other words, that the members are continuously moving as distinguished from instantaneous indicating instruments, and that in my mechanism there is no member which takes a position proportionate, at any given moment, to the in-phase or reactive component values of the alternating current.

My invention thus takes a position which is entirely practical in the arts instead of being a mere laboratory experiment.

Furthermore, by my invention, I am enabled to express the V. A. H., W. H., R. V. A. H. and power factor for selected periods of time, and for a series of periods of time during a prolonged meter operation. As will be evident from the preceding description, these expressions may be either of total quantity or a maximum quantity in any one of a series, dependent on the gearing.

I have not illustrated my charts in the mechanical showing of my invention (Figures 1-6), since they may be of any desired mechanical structure, and also the stylus may in any well known manner be caused to dot the chart at the end or during the time interval selected instead of drawing a continuous line.

Referring to Figure 7, I have marked the rollers, levers, arms, drum, pointer and dial in the same manner as in the above mechanical description. I have shown, as if mounted on the top of the housing of the mechanism above described, a dial 60 for the R. V. A. H. meter and a dial 61 for the W. H. meter. By using a friction peak indication arrow, such as is used with the dial above described, I will get a pointer indication, as at 61$^a$, of the total W. H. for the selected period of time. The same will be true of a friction pointer 60$^a$ for giving total R. V. A. for the said period of time.

The pivotal pin of the two arms carrying flexible connecting link will in this instance include a stylus, which will make a mark on the chart 62. This chart has lines drawn on the rollers, as a center, which lines will be V. A. H. lines, since the movement of the meter actuated levers will add on to each other as has been stated, and the position of the stylus at any one time will give the resultant action of the in-phase and out-of-phase components acting through the selected period.

Referring now to the chart in Figure 8, it should be noted that the constant direction gearing described for the R. V. A. meter in this case may be omitted, since leading and lagging power factor are sometimes of interest in getting full data for an electric service charge.

If the power factor is unity, the stylus between the two arms will traverse the path marked 100, since the pivotal center of the stylus carrying arm of the R. V. A. H. meter will revolve as a center on its starting point. If the power factor is zero, the pivot of the W. H. arm will be the fixed center, and the arc marked zero will be the path assumed. If the R. V. A. H. and W. H. are the same, as in the dotted line position, resulting in the stylus moving to point 63, the straight line marked .707 will be followed. If the power factor is leading, then the line marked L. .707 will be followed.

Now at the end of the timed interval, be it whatever is desired from the entire period between examinations to a minute or so, the point above which the stylus lies will give on a series of arcs, graduated between the lines mentioned, the power factor for the selected period of time.

Combining the chart of Figure 8 with the stylus marking will give V. A. H. and power factor, and readings on the dials 60 and 61 will give the R. V. A. H. and the W. H. for that time.

I prefer to have the charts fixed, although they may be movable as in a planograph, in which case the stylus might be always in contact with the paper.

Where I desire to make a mere point with the stylus I may mount on a pinion of the time movement a pin 70, which will strike a bell crank 71 to rock a lever 72. This lever will have a T-end 73 adapted to strike down on the two stylus bearing arms, thereby causing the stylus to mark the chart just in advance of the return of the two arms.

A chart marked with a series of dots, each indicating the power factor determined from the rates of movement for a given interval of time of two meters out-of-phase with each other, operating through a number of such intervals and each indicating also the V. A. H. for that period of time, taken together with a dial reading of the maximum R. V. A. H. and W. H. will give the functions of an alternating current service in the best and fairest form for making service charge calculations.

When combined together with registering dials giving total W. H. and also, if desired, registering dials giving total R. V. A. H. and with a further indicating dial giving maximum V. A. H. which need not be read on the chart, I provide a set of data from which everything but instantaneous or momentary action of the electricity supplied can be read or calculated.

I am not aware of any metering device in the past which can give these features.

I have not shown a registering dial system for the R. V. A. meter, but it will be understood that this can be supplied in the same manner as is the W. H. registering system.

I have shown the R. V. A. meter with a unidirectional motion for the member from which readings are gained, whether the power factor is leading or lagging. I could omit entirely the upper pinions and pawl carrier and thus read only the leading power factor or only the lagging power factor, as the case may be.

I am not aware of any metering device of the past in which a rate of movement instead of a proportional movement is vectorially added.

I have not attempted to mention every use to which the adoption of this feature (lacking in the prior art) may be put and specifically disclaim any intention to limit my claims that follow to a narrowing construction because of the mention of certain uses and details of structure and the failure to mention mechanical equivalents and other uses.

When referring to the in-phase and reactive components or the force of an alternating current in the claims that follow, I wish it understood that these terms are to include a portion of or one or all of the phases of a polyphase current and one or all or a part of the forces of such current, including all usual phases, voltages, frequencies and the like.

Having thus described my invention, what I claim as new and desire to secure by Letters Patent, is:—

1. An electrical measuring instrument for an alternating-current circuit comprising means responsive to the time-integrated in-phase components of the volt amperes traversing the circuit, means responsive to the time-integrated reactive components of the volt-amperes traversing the circuit and means co-operating with said responsive means for expressing the vector sum of the totals of said components which have been in effect up to the period of time when a reading of said vector sum expressing means is taken.

2. An alternating-current electrical measuring instrument comprising a pair of continuously advancing meters so connected to a circuit that one is actuated in accordance with the in-phase components of the volt amperes and the other in acordance with the out-of-phase components of the volt amperes traversing the circuit, a timing mechanism and a common member constantly and positively operated by both meters for an interval of time governed by the timing mechanism.

3. An alternating-current electrical measuring instrument comprising a pair of continuously moving meters so connected to a circuit that one is actuated in accordance with the in-phase components of the volt amperes and the other in accordance with the re-active components of the volt amperes traversing the circuit, a timing mechanism and a common member periodically reset by the timing mechanism and constantly operated by both meters during intervals of time governed by the timing mechanism, and a high value indicator operated by said common member but not reset.

4. An alternating-current electrical measuring instrument comprising a pair of continuously advancing meters so connected to a circuit that one is actuated in accordance with the in-phase components of the volt amperes and the other in accordance with the out-of-phase components of the volt amperes traversing the circuit, a timing mechanism, a common member constantly and positively operated by both meters for an interval of time governed by the timing mechanism, and means for registering the total number of revolutions of one of said meters.

5. The combination of a watt-hour meter having a driven arm moving on a fixed pivot, a reactive volt-ampere-hour meter having a driven arm moving on a fixed pivot, a common member mechanically connected to said two arms, and means for taking readings based on the position of said common member.

6. The combination of a watt-hour meter having a driven arm moving on a fixed pivot, a reactive volt-ampere-hour meter having a driven arm moving on a fixed pivot, said two arms having their motion directed toward each other, a common member mechanically connected to said two arms, and means for taking readings based on the position of said common member.

7. In an alternating-current circuit, the combination with a watt-hour meter and a driven member therefor, of a reactive watt-hour meter, a driven member therefor actuated in one direction irrespective of whether or not the current leads or lags the voltage of the circuit and a common member connected to said two driven members.

8. In an alternating-current circuit, the combination with a watt-hour meter and a driven member therefor, of a reactive watt-hour meter, a driven member therefor actuated in one direction irrespective of whether or not the current leads or lags the voltage of the circuit, a common member connected to said two driven members and a time re-setting device for the common member.

9. The combination with a watt-hour meter and a member driven thereby, of a reactive volt-ampere-hour meter, a member driven in one direction only by said reactive volt-ampere-hour meter, and a common member mechanically connected to said two driven members to be moved thereby in accordance with the volt-ampere hours of a circuit.

10. In combination, a pair of time-integrated electric meters, arranged one to be operated by the effective components and the other by the reactive components of the power traversing an alternating current circuit, both of said meters having rotary means driven thereby, arms driven by said two rotary means, in opposite directions so that they move continuously toward and away from each other, links one connected to each arm and the two to each other, and an indicator device mechanically connected to the joint between the links and comprising a member moving over a scale calibrated to express the desired function of the current which bears proportionate relation to the reactive volt-ampere hours and watt hours.

11. The combination of a watt-hour meter having a continuously moving rotary member energized thereby, a reactive volt-ampere-hour meter also having a continuously uni-directionally moving rotary member energized thereby, inflexible means deriving movement from said two members in proportion to their rate of movement, and means for taking readings from said inflexible means.

12. The combination of a watt-hour meter having a continuously moving rotary member energized thereby, a reactive volt-ampere-hour meter having a continuously moving rotary member energized thereby, arms driven by the rotary members, in a rotary manner, links of inflexible nature connected to the arms and to each other, and means for taking readings from the point of juncture of the links.

13. The combination of a watt-hour meter having a continuously moving rotary member energized thereby, a reactive volt-ampere-hour meter having a continuously moving rotary member energized thereby, arms driven by the rotary members, in a rotary member, links of inflexible nature connected to the arms and to each other, means for taking readings from the point of juncture of the links, and a time mechanism having means for periodically re-setting said arms.

14. An electrical measuring instrument comprising an indicating member, a pair of movable actuating elements therefor, one of which is subject to reversals in the direction of its movement, a member movable in one direction only in response to all movement of the reversible element, means connecting said indicating member to said first element and to said unidirectional member for causing the indicating member to operate in accordance with a resultant movement of said elements, and means for periodically disconnecting the indicating member from its operating means.

15. An electrical measuring instrument comprising an indicating member, a pair of movable actuating elements therefor, one of which is subject to reversals in the direction of its movement, means for translating the movement of said reversible element into movement in one direction only, and means connected between said indicating member and said translating means and between the indicating member and the other element for causing the indicating member to operate in accordance with a resultant movement of said elements.

16. An electrical measuring instrument comprising a watt-hour meter, a reactive-volt-ampere-hour meter, means for translating the movement of the reactive-volt-ampere-hour meter into movement in one direction only, an indicating member connected to the watt-hour meter and to said translating means for simultaneous operation thereby and means for periodically disconnecting the indicating member from the watt-hour meter and the translating means.

GEORGE SPERTI.